US012528096B2

(12) United States Patent
Tecchiolli et al.

(10) Patent No.: US 12,528,096 B2
(45) Date of Patent: Jan. 20, 2026

(54) DEVICE FOR DISPENSING A FLUID SUBSTANCE

(71) Applicant: Coster Tecnologie Speciali S.p.A., Calceranica Al Lago (IT)

(72) Inventors: Alfeo Tecchiolli, Meano (IT); Giancarlo Fontanari, Altopiano Della Vigolana (IT); Fabiano Zeni, Mezzano (IT)

(73) Assignee: Coster Tecnologie Speciali S.p.A., Calceranica Al Lago (IT)

( * ) Notice: Subject to any disclaimer, the term of this patent is extended or adjusted under 35 U.S.C. 154(b) by 227 days.

(21) Appl. No.: 18/234,139

(22) Filed: Aug. 15, 2023

(65) Prior Publication Data

US 2024/0075487 A1 Mar. 7, 2024

(30) Foreign Application Priority Data

Sep. 5, 2022 (IT) ........................ 102022000018126

(51) Int. Cl.
*B05B 11/10* (2023.01)
*B05B 11/00* (2023.01)

(52) U.S. Cl.
CPC ...... *B05B 11/1023* (2023.01); *B05B 11/0044* (2018.08); *B05B 11/1028* (2023.01);
(Continued)

(58) Field of Classification Search
CPC ............. B05B 11/1023; B05B 11/0044; B05B 11/1035; B05B 11/1036; B05B 11/1028;
(Continued)

(56) References Cited

U.S. PATENT DOCUMENTS 5,425,482 A * 6/1995 Foster ................. B05B 11/1069 222/207
6,536,630 B1 * 3/2003 Chan ..................... B05B 11/106 222/207

(Continued)

FOREIGN PATENT DOCUMENTS

CN 106428966 A 2/2017
EP 0318465 A1 * 5/1989

(Continued)

*Primary Examiner* — Paul R Durand
*Assistant Examiner* — Michael C Patterson
(74) *Attorney, Agent, or Firm* — Dickinson Wright PLLC; Andrew D. Dorisio

(57) ABSTRACT

A device (1) for dispensing a fluid substance (S) having a cup-shaped body (3) equipped, at the bottom (2) thereof, with a first valve element (4) which intercepts a passage (5) for the suction of the fluid substance into a compression chamber (6), a closing element (7) equipped with a window (8), a dispensing button (15), and a shaped element (9) functionally coupled to the dispensing button (15) for the movement thereof into the cup-shaped body (3), the shaped element (9) including a flange portion (10) configured to slide along an internal wall (3A) of the cup-shaped body, a deformable portion (11) extending from the flange portion (10) which is bell-shaped when non-deformed, the deformable portion (11) being elastically deformable, the deformable portion (11) determining, at least together with a part of the cup-shaped body (3), the compression chamber (6).

9 Claims, 3 Drawing Sheets

(52) U.S. Cl.
CPC ...... *B05B 11/1047* (2023.01); *B05B 11/1059* (2023.01); *B05B 11/1094* (2023.01); *B05B 11/0064* (2013.01); *B05B 11/0089* (2013.01); *B05B 11/1036* (2023.01); *B05B 11/1067* (2023.01)

(58) Field of Classification Search
CPC ............ B05B 11/1047; B05B 11/1059; B05B 11/1094; B05B 11/0089; B05B 11/0064; B05B 11/1067
USPC .................................................. 222/380, 207
See application file for complete search history.

(56) References Cited

U.S. PATENT DOCUMENTS

| | | | | |
|---|---|---|---|---|
| 8,206,136 | B2 * | 6/2012 | Brouwer | B05B 11/1033 92/99 |
| 10,525,493 | B2 * | 1/2020 | Rossignol | F04B 23/028 |
| 12,285,772 | B2 * | 4/2025 | Rossignol | B05B 11/1033 |
| 2012/0091229 | A1 * | 4/2012 | Laidler | B05B 11/026 222/207 |

FOREIGN PATENT DOCUMENTS

| | | | | | |
|---|---|---|---|---|---|
| JP | H1094744 | A | * | 4/1998 | |
| KR | 101322379 | B1 | * | 10/2013 | |
| KR | 101987557 | B1 | | 9/2019 | |
| KR | 102091210 | B1 | | 3/2020 | |
| KR | 20210129555 | A | * | 10/2021 | |
| KR | 20210146618 | A | | 12/2021 | |
| KR | 20210146619 | A | | 12/2021 | |
| WO | WO-2004069420 | A1 | * | 8/2004 | B05B 11/0044 |
| WO | WO-2009050978 | A1 | * | 4/2009 | B05B 11/0016 |
| WO | WO-2010050772 | A2 | * | 5/2010 | B05B 11/3035 |

* cited by examiner

DEVICE FOR DISPENSING A FLUID SUBSTANCE

This application claims the benefit of Italian Patent Application for Invention No. 102022000018126 filed on Sep. 5, 2022, the disclosure of which is incorporated herein by reference.

FIELD OF THE INVENTION

The present invention relates to a fluid substance dispensing device.

In particular, it refers to a dispensing device comprising a manually operated pump.

BACKGROUND ART

Commonly known devices for dispensing a fluid substance comprise a manual pump which, when pressed against a (normally metallic) spring, enables dispensing of the fluid substance by means of a dispensing button.

Commonly known devices are formed of many parts and are therefore costly.

Furthermore, the said devices comprise parts made of different materials (metals, plastics) which are difficult to recycle and not very environmentally sound.

SUMMARY OF THE INVENTION

The object of the present invention is to provide a dispensing device which is improved compared with the prior art.

A further object of the invention is to provide a device which is more simply constructed and less costly.

A still further object of the present invention is to provide a device which is more environmentally sound than those according to prior art.

This and other objects are achieved by means of a fluid substance dispensing device according to the technical teachings of the appended claims.

BRIEF DESCRIPTION OF THE FIGURES

Further features and advantages of the innovation will become clearer in the description of a preferred but not exclusive embodiment of the dispensing device, illustrated—by way of a non-limiting example—in the drawings annexed hereto, in which.

DETAILED DESCRIPTION OF THE INVENTION

Figure 1:
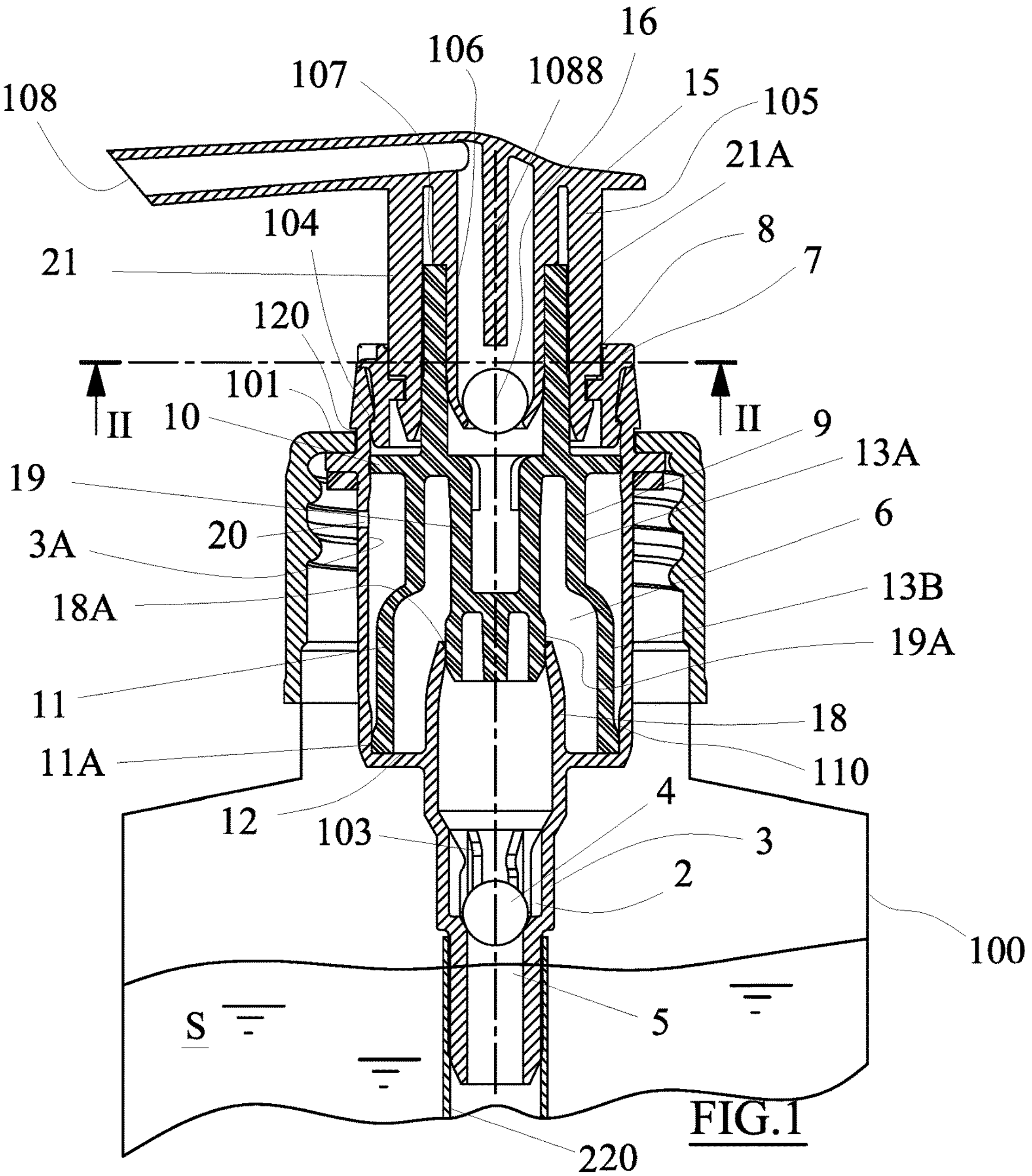
FIG. 1 is an axial sectional view of a device according to the invention in the closed position, taken along the line I-I in FIG. 2.

With reference to the figures stated, reference number 1 is used to denote, as a whole, a fluid substance dispensing device.

The device 1 is configured to be coupled, for example by means of a threaded ring nut 101 or other fastening system, to a fluid substance S container 100.

By way of example, the fluid substance can be relatively dense, such as a cream, a soap, a cleansing milk, or a cosmetic or medical product in general.

The device 1 for dispensing a fluid substance S according to the present invention comprises a cup-shaped body 3 equipped, at the bottom 2 thereof, with a first valve element 4 which intercepts a passage 5 for the suction of the said fluid substance into a compression chamber 6.

The first valve element 4 can comprise a ball, preferably made of plastic but also of metal, or another suitable material, which sealingly couples with a surface delimiting the passage 5, sealingly closing the said passage.

The ball has freedom of movement (towards the compression chamber 6) so as to be able to clear the passage 5 in the event of a vacuum in the compression chamber 6.

For this purpose, the ball is housed in a specific seat, which limits the upward movement thereof, as shown in FIG. 1, for example by means of teeth 103.

Obviously, other known sealing valve systems can be envisaged instead of the ball.

The cup-shaped body 3 is coupled, preferably by snap fitting or in any case fixed in another way, to a closing element 7. The closing element is coupled with a free end of the cup-shaped body 3.

Figure 7:
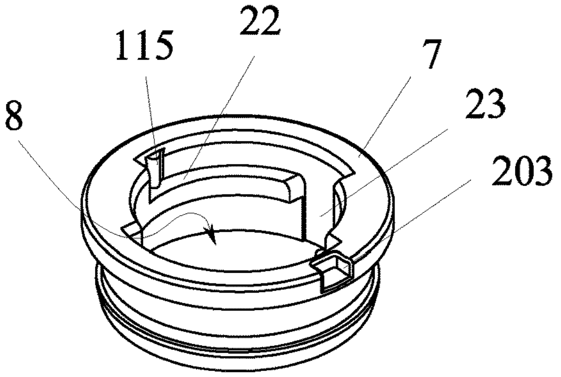
FIG. 7 is a perspective view of a closing element of the device according to the present invention.

The closing element 7, which is shown better in FIG. 7, has window 8 which allows the passage of a dispensing button 15.

The dispensing button 15 can be slidingly coupled to the closing element 7, so as to penetrate the window 8. To prevent the dispensing button 15 from being pulled out of the closing element 7, an undercut coupling 104 can be featured between the two elements.

For example, teeth (not shown) can be featured which are made on the dispensing button 15 and engage (for example by snap-fit) with an edge delimiting the opening 8 in the closing element.

Internally to the cup-shaped body 3 there is a shaped element 9, which is functionally coupled to the dispensing button 15 for movement thereof inside the cup-shaped body 3.

For example, the shaped element 9 can comprise a hollow tubular portion 14, which preferably extends from a flange portion 10 of the shaped element and to which the dispensing button 15 is sealingly coupled.

The dispensing button 15 can have a (for example, essentially tubular) external wall 105 and an internal wall 106 which is also essentially tubular, or at least a portion thereof is.

The hollow tubular portion 14 can be sealingly fitted between the internal wall 106 and the external wall 105.

To prevent axial movement of the hollow tubular portion 14 with respect to the dispensing button, one of the external and internal walls can include a stop 107 which abuts a free end of the hollow tubular portion 14.

The internal wall 106 may delimit a cavity in communication with a dispensing port 108 in the dispensing button.

Furthermore, the internal wall 106 can delimit the seat of a second valve element 16 in communication with the said compression chamber 6.

Indeed, the dispensing button 15 can comprise a second valve element 16 which is in communication with the said compression chamber 6, preferably by means of the said hollow tubular portion 14.

It should be noted that, as an alternative to the arrangement described above, the second valve element 16 (or at least a part thereof) may be made directly in the shaped element 9.

As can be seen in FIG. 1, the valve element 16 can include a ball similar to that of the first valve element 4, which is secured at the bottom by a tapered free edge of the internal wall 106, and at the top (but also with freedom of movement) by an elongated element 1088 extending within the cavity delimited by the second wall 106.

As already mentioned, the shaped element 9 comprises a flange portion 10 configured to slide, in an essentially sealed manner, along an internal wall 3A of the cup-shaped body 3.

From the flange portion 10 there extends a deformable portion 11 which, when not deformed or only slightly deformed, is bell-shaped.

The deformable portion 11 is elastically deformable and essentially acts as an elastic element which counters the movement of the dispensing button 15.

In an upper stroke limit position, such as the one shown in FIG. 1, the deformable portion 11 can be slightly deformed so as to guarantee the dispensing button 15 a slight preload.

The deformable portion 11 also delimits, together with at least part of the cup-shaped body 3, the said compression chamber 6.

Advantageously, a free end of the deformable portion 11 rests on a step 12 made in the said cup-shaped body 3.

Reciprocal fastening means 11A, 110 can be featured between the portion proximal to the free end of the deformable portion 11 and the cup-shaped body. For example, the deformable portion can feature an enlarged edge 11A, envisaged proximal to the free end thereof, which cooperates with a thicker portion 110 of the cup-shaped body 3, so as to form a sealed connection, preferably by means of a snap-fit or undercut.

Figure 5:
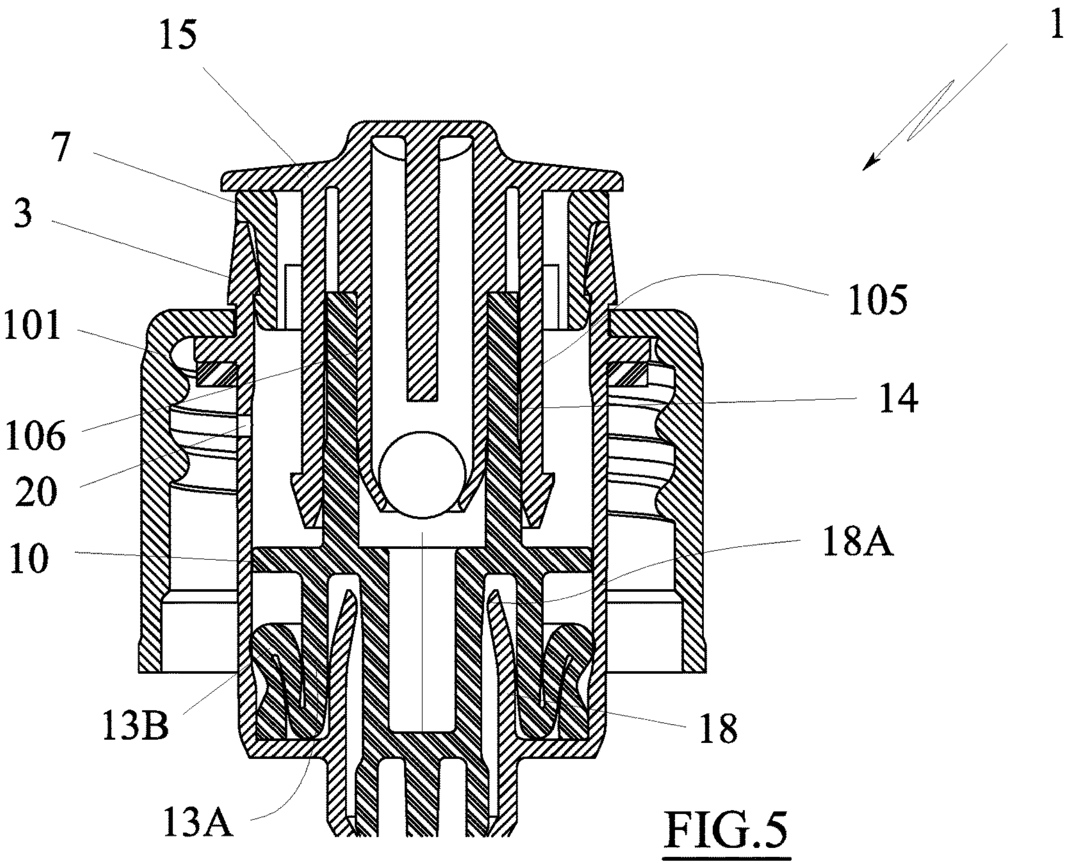
FIG. 5 is a schematic, simplified section with certain details omitted, which is similar to that shown in FIG. 3, but in a condition wherein a dispensing button is at the lower stroke limit position.

The deformable portion 11—when not deformed (or only minimally deformed) as shown in FIG. 1 (i.e. when the dispensing button 11 is at an upper stroke limit thereof)—can comprise a first zone 13A with an essentially cylindrical conformation and a second zone 13B with an essentially cylindrical conformation and a diameter greater than that of the first zone 13A, so that, when the deformable portion 11 is completely deformed (as shown in FIG. 5), the first zone 13A is diametrically internal to at least part of the second zone 13B.

Obviously, to ensure the seal of the compression chamber 6, the first and second zones 13A, 13B can be connected seamlessly.

The first zone 13A preferably extends from the said flanged portion 10.

The cup-shaped body 3 can feature a tubular projection 18 which extends from the bottom 2 thereof, and is equipped with an opening 18A which cooperates with a shutter 19 which extends from the said flange element 10 and which closes the said opening 18A at least when the dispensing device is at an upper stroke limit point (FIG. 1).

For example, the shutter 19 can feature a swelling 19A which, when engaged with a free end of the said opening 18A (which can also be or comprise a sealing lip) sealingly closes the said opening 18A.

The convex form of the swelling 19A is such as to close the opening 18A only when the dispensing button 15 is near the upper stroke limit position (FIGS. 1, 3, and 4); this is to prevent the fluid substance from being dispersed through the dispensing port 108 when the device is upside down or lying on the side thereof, i.e. to prevent the pump from leaking.

Meanwhile, when the dispensing button 15 is distal (even slightly) from the said upper stroke limit position, the opening 18A is clear to allow fluid exchange between the compression chamber 6 and the area above the first valve element 4.

To compensate, inside the container 100, for the volume of fluid substance dispensed, the cup-shaped body 3 can feature a passage 20 which connects an external surface of the cup-shaped body 3 with the external environment when the said flange element 10 is located between the first valve element 4 and the said passage 20, thereby allowing air to enter the container.

On the other hand, when the flange portion 10 is located between the passage 20 and the closing element 7, the passage is completely isolated from the exterior precisely by the seal that the flange portion 10 performs on the internal surface of the cup-shaped body.

As already mentioned, in FIG. 1, the device is in a closed condition.

Figure 2:
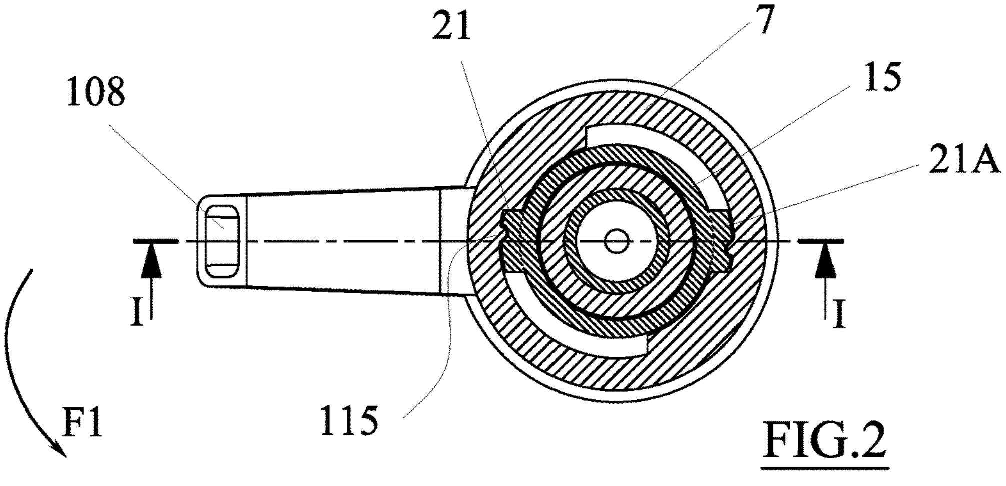
FIG. 2 is a sectional view taken along the line II-II in FIG. 1.
Figure 8:
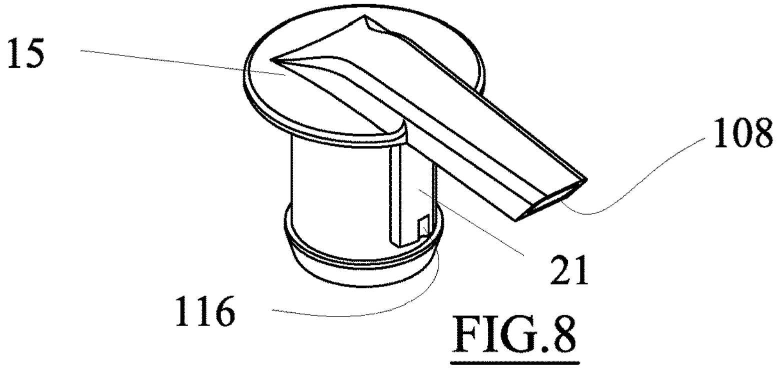
FIG. 8 is a perspective view of a dispensing button of the device according to the present invention.

In this position, at least one dispensing button 15 guide 21 is configured so as to abut (at least when the button 15 is pressed) a surface 22 of the closing element 7 (see also FIGS. 2, 7, and 8), so as to prevent axial movement of the dispensing button 15. Advantageously, a further guide 21A is featured, arranged diametrically with respect to the first.

While when the dispenser button 15 is rotated by 90 degrees (therefore in the direction of the arrow F1 in FIG. 2), at least the guide 21 is in an angular open position (FIGS. 3, 4, and 5) and is free to slide into a recess 23 in the closing element 7.

Advantageously, snap-fit elements 115 and 116 can be featured between the dispensing button 15 and the closing element 7 (FIGS. 7 and 8) which, by cooperating, stabilise the closed position.

It should be emphasised that, as can be appreciated from the drawings, the shaped element 9 can be made as a single piece.

Therefore at least the flange portion 10, the deformable portion 11 and the hollow tubular portion 14 can be made as a single piece of deformable material.

Advantageously also the shutter 19, and optionally the swelling 19A, are made integrally with the flange portion 10, the deformable portion 11, and the hollow tubular portion 14.

Some materials suitable for making the shaped element 9 include PP, PE, TPO, TPE, TPU, and silicone.

Advantageously, the shaped element is made by injection moulding but also by co-injection.

It has been found that the use of LLDPE, TPE, TPO, and silicone makes production of the shaped element particularly advantageous. This material allows the deformable portion 11 to act as an elastic element against which the dispensing button 15 moves and simultaneously at least partially delimit the compression chamber.

Advantageously, the use of this material can allow the hermetic seal of the flange 10 against the internal wall 3A of the cup-shaped body 3 and/or allow the hermetic seal between the opening 18A and the swelling 19A and/or allow the hermetic seal between the surface 11A of the shaped element 9 and the surface 110 of the cup-shaped body.

It can also allow easy execution of the undercut (swelling 19A) on the shaped element 9.

To complete the description, it must be emphasised that the device can feature a ring nut 101 which is rotatably fixed in an undercut manner in a groove 120 in the cup-shaped body 3.

The ring nut 101 can also be made integrally with the cup-shaped body 3 and can be fixed on the container 100, for example with a thread system or by means of a snap-fit system.

The operation envisaged in the invention is apparent from the description above and is essentially as follows.

During transport, the dispensing device 1 is in the position shown in FIGS. 1 (and 2), if necessary already coupled with the container 100 filled with the fluid substance S.

The closed position shown in FIG. 1 is very stable thanks to the presence of the snap-fit elements 115 and 116.

Figure 6:
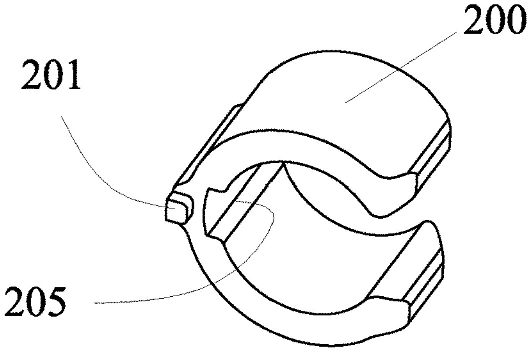
FIG. 6 is a perspective view of a seal that can optionally be coupled with the device according to the present invention.

In a transport condition, the device 1 can include a seal 200 like the one shown in FIG. 6. The said seal couples with the external wall 105 of the dispensing button 15 when pushed from the spout side, so that—deforming elastically—the said seal embraces precisely this external wall 105 with a slight interference fit.

Advantageously, the seal 200 has a centring element 201 which, by engaging in a special seat 203 envisaged on the closing element 7, prevents the latter rotating (with respect to the cup-shaped body) and the device consequently opening.

Furthermore, the seal 200 can feature a recess 205 which couples perfectly with the dispensing button 15 guide 21, thereby torsionally coupling the seal 200 and the button 15, precisely to prevent, together with the centring element 201, accidental rotation of the button 15.

Figure 3:
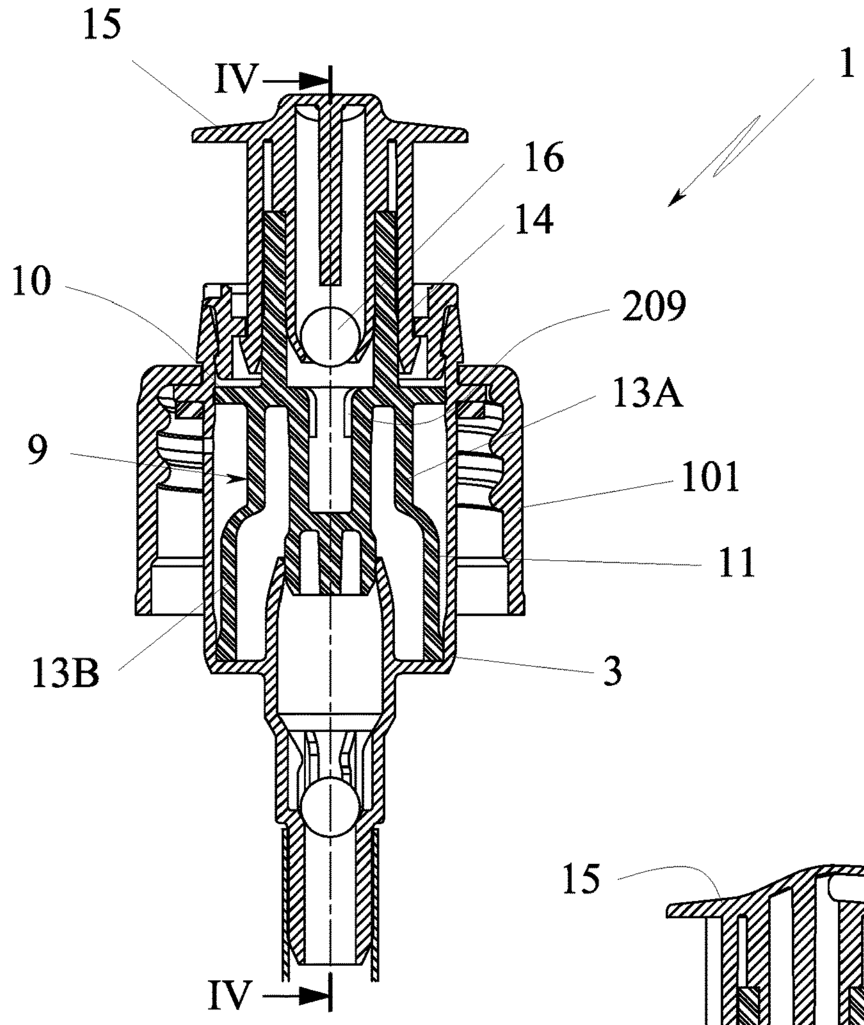
FIG. 3 is the sectional view in FIG. 1, wherein the device is in an open condition.
Figure 4:
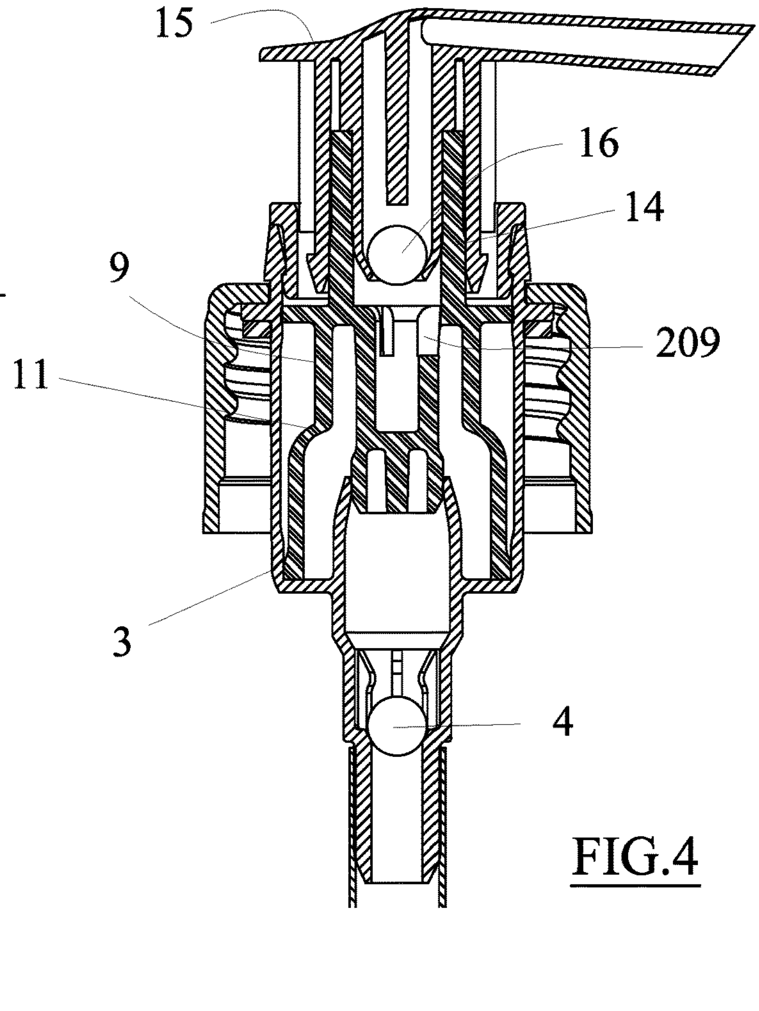
FIG. 4 is a section view taken along line IV-IV in FIG. 3.

Once the seal 200 has been removed, since only needed during transport, for example for the purposes of passing a physical performance test, known as the AMAZON® test, it is possible to rotate the dispensing button in the direction shown by the arrow F1, thereby reaching the (open) condition illustrated in FIGS. 3 and 4.

Once the pump has been primed, pressing the dispenser button 15 again causes expulsion of the fluid substance, which fills the compression chamber 6.

As soon as the pressure in the compression chamber 6 rises (therefore a short distance from the top dead centre of the dispensing button 15), the first valve element 4 closes. The substance S passes through the ports 209 in the shaped element 9, reaching the cavity of the tubular portion 14 and from there, the second valve element 16, which is driven open. Dispensing then begins via the port 108.

During dispensing, when the flange element 10 drops below the passage 20, it is in communication with the exterior of the device, allowing—where appropriate—compensation of the pressure inside the container 100.

Dispensing continues until the deformable portion reaches the condition shown in FIG. 5, i.e. with a part of the button 15 abutting the closing element 7.

It should be noted that, in this condition, the first zone 13A is inside the second zone 13B, the latter being positioned outside the former.

The deformation of the first zone 13A and the second zone 13B is guided within the annular cavity determined laterally by the cylindrical wall of the cup-shaped body 3 and by the tubular projection 18, which can be tapered near the free end thereof, precisely to guide deformation of the first zone 13A and the second zone 13B.

When the pressure on the dispensing button 15 is released, the deformable portion 11 returns elastically into its bell shape.

In this situation, a vacuum is created in the compression chamber 6, which closes the second valve element 16.

The substance S drawn from the container 100 is then suctioned (if necessary, through a suction tube 220), lifts the first valve element 4, and fills the compression chamber 6 gradually as it returns to its non-deformed configuration, shown in FIG. 3.

It should be noted that the flange portion 10 is in sealed contact with the internal wall 3A both when the deformable portion is free of deformation (as represented in FIG. 3 i.e. upper stroke position) and when the deformable portion is fully deformed as represented in FIG. 5 (lower stroke position).

The flange portion 10 may be in contact with the internal wall 3A also in every position between the upper and lower stroke position (i.e. for any deformation of the deformable portion 11 and also when the deformable portion 11 is free of deformation).

Basically, the bell-shaped deformable portion 11 is entirely located between the flange portion 10 and the bottom 2 of the cup shaped body.

The Device 1 for dispensing a fluid substance S may comprise a cup-shaped body 3 equipped, in correspondence with its own bottom 2, with a first valve element 4 which intercepts a suction passage 5 of said fluid substance in a compression chamber 6, a closure element 7 of the cup-shaped body 3 equipped with a window 8, a dispensing button 15 and a shaped element 9 functionally coupled to the dispenser button 15 for its movement inside the cup-shaped body 3, the shaped element 9 comprising a flange portion 10 configured to slide on an internal wall 3A of the cup-shaped body, from the flange portion 10 extending a deformable portion 11 which, when free of deformation, is bell-shaped, the deformable portion 11 being elastically deformable, said deformable portion 11 defining, at least together with a part of the cup-shaped body 3, said compression chamber 6.

Possibly the device may have a free end of the deformable portion 11 that rests on a step 12 defined in said cup body 3.

Possibly, in the device, the deformable portion 11, when it is free of deformation, comprises a first zone 13A with a substantially cylindrical conformation and a second zone 13B with a substantially cylindrical conformation with a diameter greater than to that of the first zone 13A, so that, when the deformable portion 11 is completely deformed, the first zone 13A is internal to at least part of the second zone 13B, the first and the second zone 13A, 13B being continuously joined, the first zone 13A preferably extending from said flange portion.

Possibly, in the device, the shaped element 9 comprises a hollow tubular portion 14, which extends preferably from said flange portion 10, to which the dispensing button 15 is sealedly coupled.

Possibly, in the device, the dispensing button 15 comprises a second valve element 16 in communication with said compression chamber 6, preferably through said hollow tubular portion 14.

Possibly, in the device, the cup-shaped body 3 has a tubular projection 18 equipped with an opening 18A which cooperates with a shutter 19 extending from said flange element 10 and which closes said opening 18A at least when the dispensing device is at an upper end-of-stroke point.

Possibly, in the device, the shutter 19 provides a swelling 19A which, when engaged with a free end of said opening 18A, closes said opening 18A.

Possibly, in the device, the cup-shaped body 3 provides a passage 20 which, when said flange element is between the first valve element 4 and said passage 20, communicates an external surface of the cup-shaped body 3 with the external environment.

Possibly, in the device, the dispensing button 15 comprises at least one guide 21 configured so that, when the dispensing button 15 is in a closed angular position, it abuts a surface 22 of the closing element 7, while when it is in an angular open position it is free to slide in a recess 23 of the closing element 7.

Possibly, in the device, the flange portion 10, the deformable portion 11 and the hollow tubular portion 14 are formed in a single piece of deformable material, and/or in which also the shutter 19, and optionally the swelling 19A, are made in one piece with the flange portion 10, the deformable portion 11 and the hollow tubular portion 14.

Various embodiments of the innovation have been disclosed herein, but further embodiments may also be conceived using the same innovative concept.

The invention claimed is:

1. A device (1) for dispensing a fluid substance(S) comprising a cup-shaped body (3) equipped, in correspondence with a bottom (2) of the cup-shaped body, with a first valve element (4) which intercepts a suction passage (5) of said fluid substance in a compression chamber (6), a closing element (7) of the cup-shaped body (3) equipped with a window (8), a dispensing button (15) and a shaped element (9) functionally coupled to the dispensing button (15) for movement of the dispensing button inside the cup-shaped body (3), the shaped element (9) comprising a flange portion (10) configured to slide on an internal wall (3A) of the cup-shaped body, from the flange portion (10) extending a deformable portion (11) which, when free of deformation, is bell-shaped, the deformable portion (11) being elastically deformable, said deformable portion (11) defining, at least together with a part of the cup-shaped body (3), said compression chamber (6), the cup-shaped body (3) having a tubular projection (18) equipped with an opening (18A) which cooperates with a shutter (19) extending from said flange portion (10) and which closes said opening (18A) at least when the dispensing device is at an upper stroke limit point.

2. The device according to claim 1, in which a free end of the deformable portion (11) rests on a step (12) defined in said cup-shaped body (3).

3. The device according to claim 1, wherein the deformable portion (11), when free of deformation, comprises a first zone (13A) with a cylindrical conformation and a second zone (13B) with a cylindrical conformation with a diameter greater than a diameter of the first zone (13A), so that, when the deformable portion (11) is completely deformed, the first zone (13A) is internal to at least part of the second zone (13B), the first and the second zone (13A, 13B) being continuously joined, the first zone (13A) extending from said flange portion.

4. The device according to claim 1, wherein the shaped element (9) comprises a hollow tubular portion (14), which extends from said flange portion (10) and, to which the dispensing button (15) is sealedly coupled.

5. The device according to claim 4, wherein the dispensing button (15) comprises a second valve element (16) in communication with said compression chamber (6), through said hollow tubular portion (14).

6. The device according to claim 1, in which the shutter (19) provides a swelling (19A) which, when engaged with a free end of said opening (18A), closes said opening (18A).

7. The device according to claim 1, wherein said cup-shaped body (3) provides a passage (20) which, when said flange portion is between the first valve element (4) and said passage (20), communicates an external surface of the cup-shaped body (3) with an external environment.

8. The device according to claim 1, wherein the dispensing button (15) comprises at least one guide (21) configured so that, when the dispensing button (15) is in a closed angular position, the at least one guide (21) abuts a surface (22) of the closing element (7), while when the dispensing button (15) is in an angular open position the at least one guide (21) is free to slide in a recess (23) of the closing element (7).

9. The device according to claim 1 in which the flange portion (10), the deformable portion (11) and a hollow tubular portion (14) are formed in a single piece of deformable material, or in which also the shutter (19) is made in one piece with the flange portion (10), the deformable portion (11) and the hollow tubular portion (14).

* * * * *